July 3, 1928.
J. A. DIENNER
1,675,698
LIQUID LEVEL INDICATOR
Filed Jan. 25, 1922
4 Sheets-Sheet 3
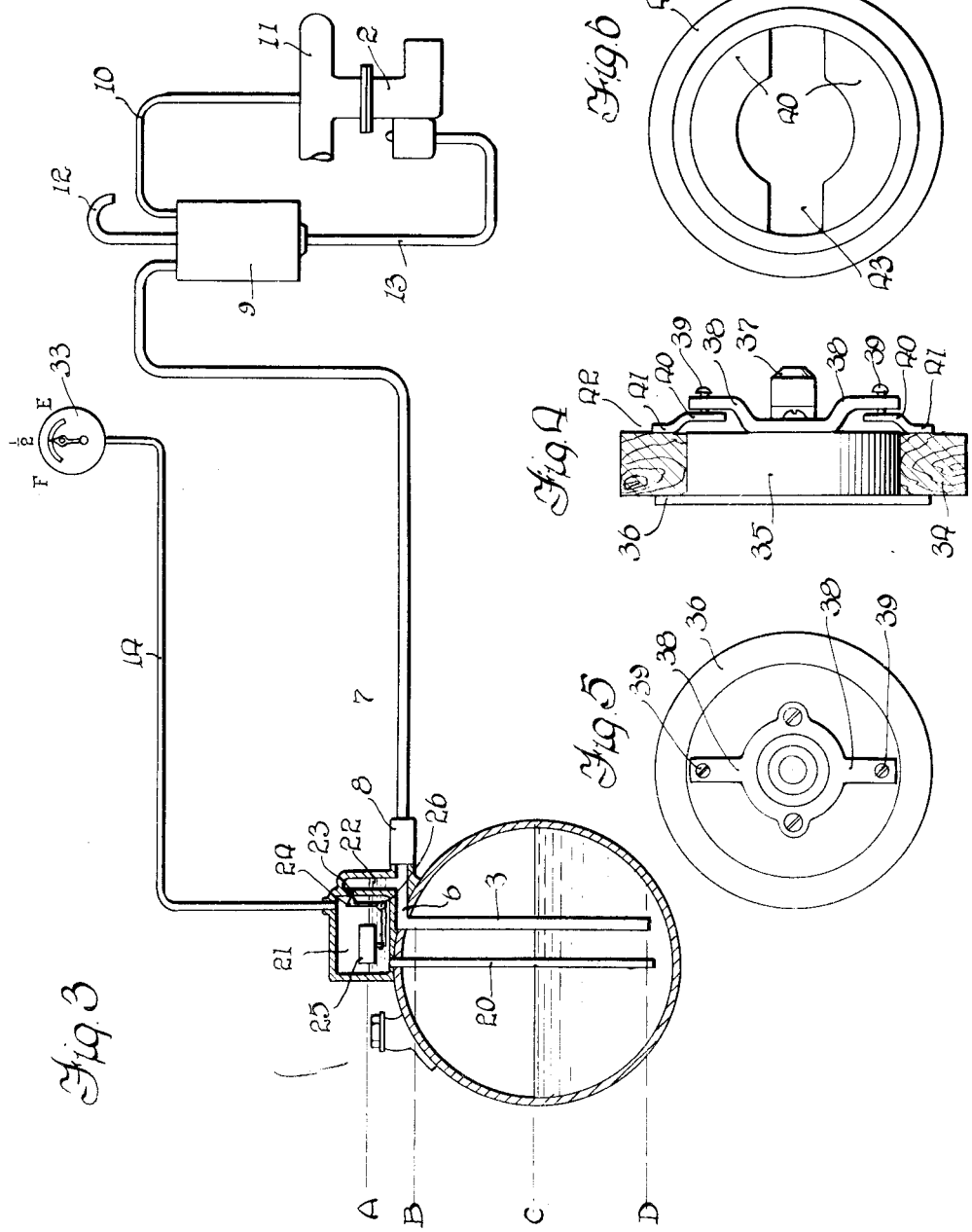
Inventor
John A. Dienner
By Brown Boettcher Dienner
Att'ys July 3, 1928.  1,675,698
J. A. DIENNER
LIQUID LEVEL INDICATOR
Filed Jan. 25, 1922 4 Sheets-Sheet 4
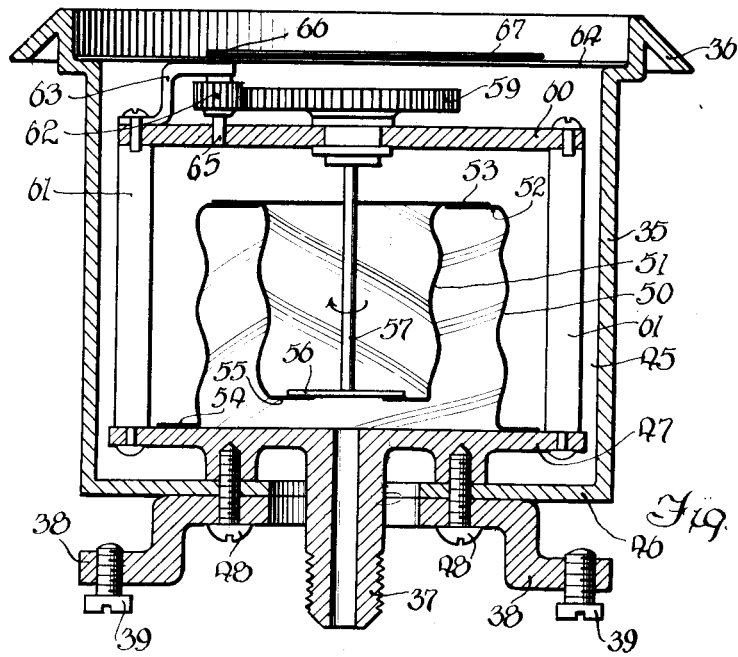
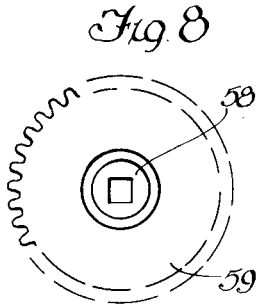
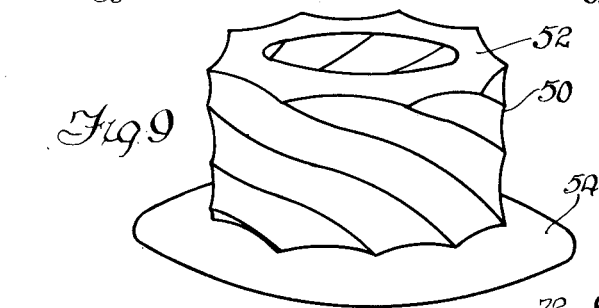
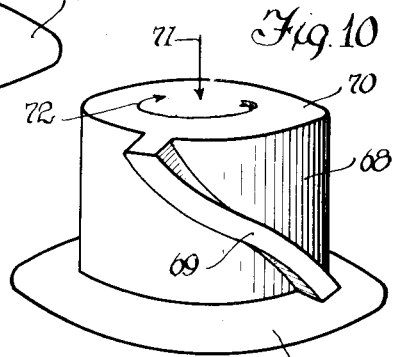
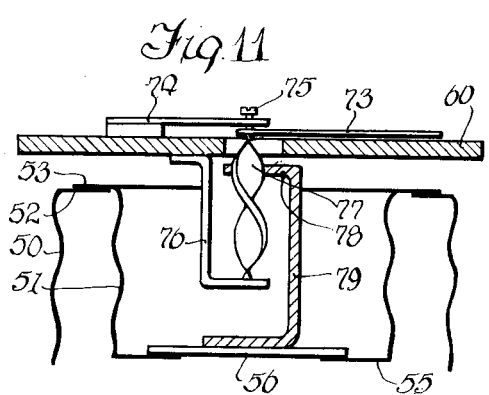
Inventor
John A. Dienner
By Brown Boettcher & Dienner
Att'ys Patented July 3, 1928.

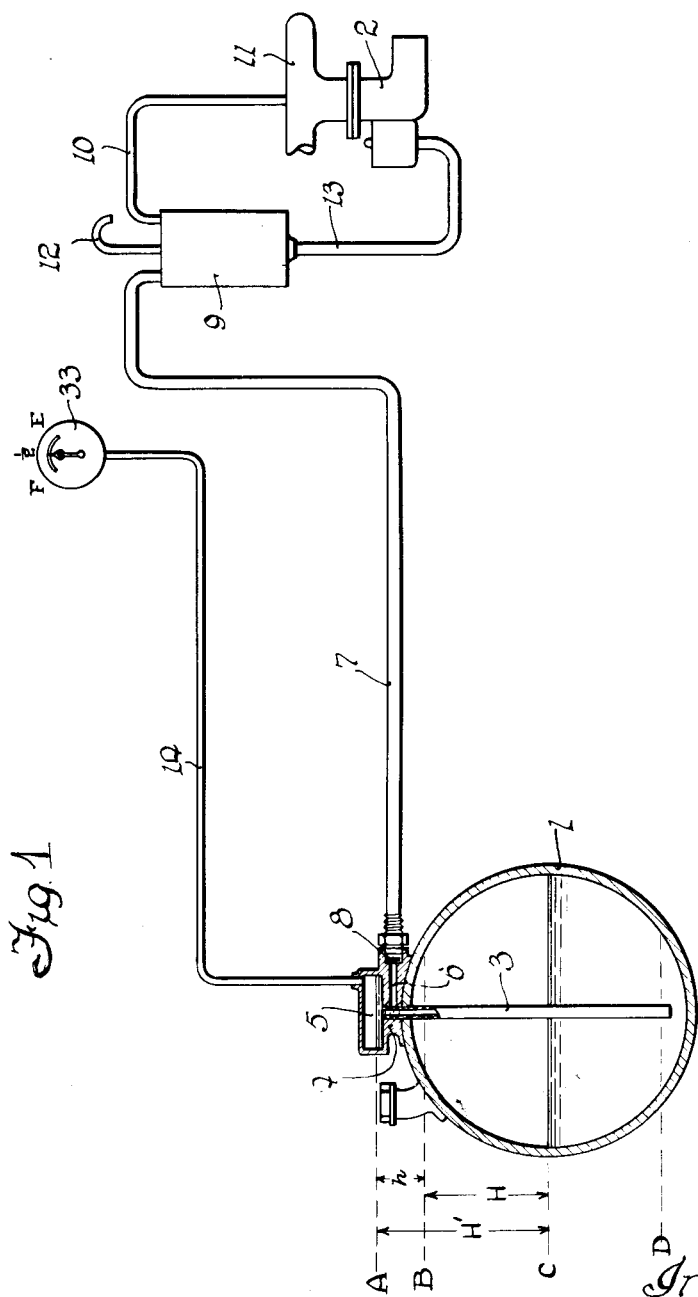

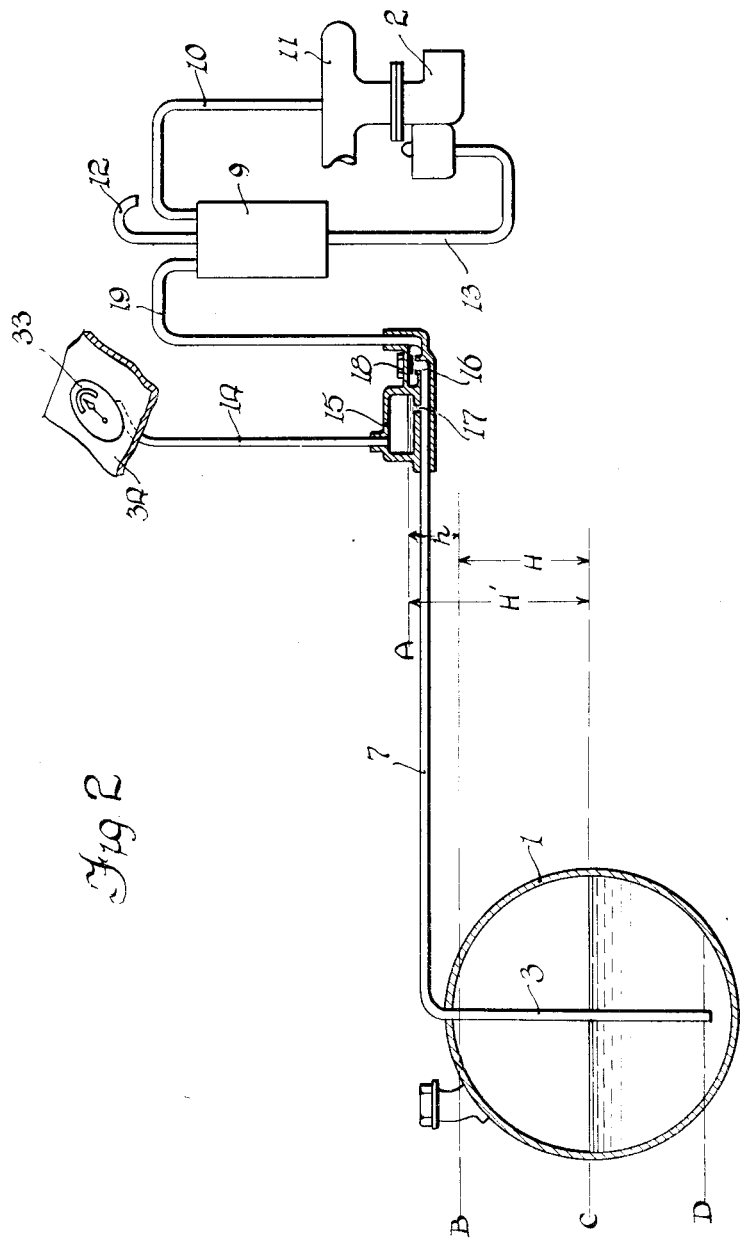

1,675,698

UNITED STATES PATENT OFFICE.

JOHN A. DIENNER, OF CHICAGO, ILLINOIS, ASSIGNOR TO STROMBERG MOTOR DEVICES CO., OF CHICAGO, ILLINOIS, A CORPORATION OF ILLINOIS.

LIQUID-LEVEL INDICATOR.

Application filed January 25, 1922. Serial No. 531,596.

My invention relates to indicators for indicating at a distance the quantity of liquid in a tank.

The chief object of the invention is to provide an improved indicator for automobiles for indicating upon the dash board or instrument board in front of the driver, the quantity of fuel in the main tank at the rear of the car.

Due to the design of most automobiles, the main fuel tank is disposed at the rear of the car at a level below the carbureter. The most popular method of raising the fuel to the carbureter is by means of the suction of the engine, either by causing the same to operate upon a separate tank as in the well known Stewart-Warner system or to act upon the float chamber of the carbureter directly. In either case, the preponderance of air pressure acting upon the surface of the liquid in the main tank, over the pressure prevailing at the outer end of the supply pipe causes the liquid to be forced through the supply pipe to the desired point of delivery. Obviously the lower the level falls in the main tank the greater is the lift required to raise the fuel in the tank to some fixed point above the tank.

According to the preferred form of my invention, I provide an indicator responsive to suction and having a scale which is graduated in accordance with the shape and size of the tank and connect the same to such a fixed point whereby the indicator may read directly the amount of fuel in said tank.

To make the indication remain after the engine ceases to operate and between operations of the suction means, I provide a check valve in the delivery main, so that the indicator is subject to the suction created by the tendency of the column of fuel to fall to the level in the tank at such times.

Preferably I provide the connection of the indicator to the delivery or suction main at a point directly above the main tank, so that fore and aft tilting of the car will not affect the operation of the indicator materially. However, the installation of my invention in existing cars may be greatly simplified by installing the connection at a point adjacent the dash or instrument board. The small error that is caused by inclination or tilting of the car is negligible since the car at rest generally stands at no great inclination.

In order to acquaint those skilled in the art with the manner of construction and operating my invention, I shall now describe in connection with the accompanying drawings a particular embodiment of my invention.

In the drawings:

Figure 1 is a diagrammatic illustration partly in elevation and partly in section illustrating an embodiment of my invention;

Fig. 2 is a similar view of a modification;

Fig. 3 is a similar view of a further modification;

Fig. 4 is a side view of the indicator showing the manner of mounting the same upon the instrument board;

Fig. 5 is a rear elevational view of the indicator; and

Fig. 6 is a plan view of the collar or clamping washer;

Fig. 7 is a cross section of a novel form of suction responsive indicator which I may employ;

Fig. 8 is a detail rear view of one of the gear wheels;

Fig. 9 is an isometric view of one of the spirally corrugated cylinders;

Fig. 10 is a diagram for explaining the operation of the spirally corrugated diaphragm; and Fig. 11 is a fragmentary sectional view of a modification of the means for operating the instrument pointer.

The same elements shown on different figures of the drawings are indicated by the same reference characters.

In Fig. 1, I have shown one manner of embodying the present invention.

The main tank 1 which may be of any suitable shape and size is mounted at the rear of the car and below the carbureter 2.

A vertical pipe 3 extends down toward and adjacent to the bottom of tank 1. This pipe is rigidly supported from the top of the tank as by means of a casting 4 which has formed in connection therewith an expansion chamber 5. A passageway 6 which communicates with the vertical pipe 3 forms a connection with a gasoline delivery main 7 through a check valve 8. The casting 4 may form the housing of the check valve 8. This valve comprises preferably a light thin disc of aluminum of fairly large area so that it may be easily moved both to and away from its seat. When placed in a horizontal position as shown in Fig. 1, I preferably provide a light spring for closing the valve. When the valve is placed in a vertical position as shown in Fig. 2, I omit the spring since the valve closes by gravity.

The gasoline main leads to the top of the Stewart Warner or other suitable suction tank 9, this tank having a suction connection 10 leading to the engine manifold 11, an atmospheric connection 12 and a gasoline delivery pipe 13 leading to the carburetor 2. A suction operated indicator or vacuum gage 33 which comprises preferably a small gage of the diaphragm type is mounted on the instrument board of the automobile. It is graduated in terms of the contents of the tank 1 as shown in Fig. 1. This vacuum gage 33 is connected to the expansion chamber 5 by a small bore tube 14, so that its diaphragm is subjected to the suction prevailing in the said chamber 5.

The chamber 5 should ordinarily be of a capacity not materially less than one seventh (and preferably greater) of the capacity of the small bore tube so that it will not be more than filled by the alternate contractions and expansions of the air in said chamber and tube for a change in pressure of about two pounds. The desired result is to confine the small variation in level to the expansion chamber itself and to this end, I preferably make the chamber relatively large in diameter and squat as to depth.

The principle and method of operation will be understood from the following. Assume that the level within the tank 1 varies between levels indicated by lines B and D and at present lies at line C, and assume that the level of liquid in the chamber 5 is constant and lies at line A. This latter assumption is not exactly true, but is true for all practical purposes.

Assume that suction operates on the tank 9 to draw fuel through the vertical pipe. The engine suction is greater than the difference in level of liquid in tank 1 and tank 9 and hence the liquid flows from tank 1 through pipe 3, expansion chamber 5, check valve 8, suction main 7 into tank 9 trying to equalize the pressures.

The suction being greater than that required for pure lift, will cause at once a depression in chamber 5, tube 14 and indicator above the maximum pure lift, throwing the indicator hand off of the scale and thereby indicating that the suction tank is working. This high active suction draws a certain amount of air out of the chamber 5. Consequently as soon as the tank 9 cuts-off and is connected to atmosphere, the check valve 8 closes, the gasoline flows up through the upper end of pipe 3 into the chamber assuming substantially level A and remaining at said level until the suction tank 9 again operates.

Now the depression in fluid pressure below atmospheric in the chamber 5 is balanced against a column of liquid extending from level A to level C. This column is of a height $H'$, consisting of the height $h+H$. The quantity that the indicator 33 should show is H, the variation of the level from the full position. But $h$ is a constant, hence it may be compensated for on the dial by a zero adjustment of the dial of the instrument with respect to the pointer or vice versa. In this way, the suction which operates upon the indicator between operations of the vacuum tank 9 may and does accurately indicate the variations in level in the tank 1. The dial is graduated in terms of quantity.

If when the level is at any point such as at C gasoline be poured into the tank 1, the pressure in the chamber 5 will be increased by rising of the level in chamber 5, and the indicator 33 be actuated accordingly to show the increase in quantity in tank 1.

It will be observed that the suction of the vacuum tank 9 when the same is in operation is always higher than the suction prevailing in the expansion chamber 5. This is true because the lift to the former is necessarily greater. It will also be observed that the suction in the chamber 5 is greater when the tank 9 is acting to draw a charge than during the time that the tank 9 is connected to atmosphere. This higher suction draws the excess air or gas out of the indicating system so that a correct indication will invariably be set up after each suction stroke of the tank 9.

In Fig. 2, I have illustrated an embodiment in which the expansion tank 15 is placed in the forward part of the car in order to make the run of tubing 14 as short as possible. The chamber 15 is preferably attached to a part of the frame so that it maintains a fixed height with respect to the tank 1, said tank 1 being also connected to the frame. The chamber 15 is formed with a passageway 16 and a communicating port 17 for connecting the passageway 16 with chamber 15. The check valve 18 is placed in vertical position to close by gravity. The column of liquid contained in the pipe 19 seals the check valve 18 against leakage when the vacuum tank 9 is idle.

The method of operation is identical with that previously described in connection with Fig. 1.

In the system shown in Fig. 3, the indicating system is a complete and separate system and is connected to the vacuum system for correction only. It will be observed that in the systems previously described the vertical pipe 3 is common to the indicating system and to the feed system. In Fig. 3, the indicator 33 is connected by a separate conduit to the low level point of the main tank 1. This includes small bore pipe 14, expansion chamber 21 and pipe 20. A connection between this conduit and the suction system is formed by the passageway 22 and port 23. The port 23 in the present instance is placed above the normal level A and is adapted to be controlled by a valve 24 operated by float 25. The valve 24 is closed when the level stands at A in the chamber 21.

The particular advantage of the system shown in Fig. 3 resides in the fact that the level in expansion tank 21 is kept constant by valve 23—24. A further advantage is that as soon as the pipe 20 and expansion chamber 21 are properly filled, the high active suction of tank 9 which acts upon the indicator is cut off, but any leakage which would tend to impair the indicating system is harmless since the succeeding operation of the tank 9 clears out the indicating system and insures a proper setting of said indicating system just as it does in the system shown in Figs. 1 and 2.

In Figs. 4, 5, and 6, I have shown the manner of mounting the indicating head or instrument 33 upon the instrument board 34. The instrument has a cylindrical surface 35 along the sides and a flange 36 at the front edge. This flange engages the front of the instrument board. At the back, the nipple 37 communicates with the diaphragm chamber not shown. This nipple is preferably placed centrally of the casing of the instrument. Two or more brackets 38 are mounted on the rear of the casing of the instrument, these brackets lying within the periphery of the cylindrical walls 35. The ends of the brackets are spaced away from the back of the casing and they bear the clamping screws 39 which engage the inner flange 40 of the washer or ring 42. The inner flange of the ring 42 is notched at 43 to receive the brackets 38. The diameter of the flange 40 is such as to bring the same under the clamping screws 39. The ring 42 is applied to the instrument 33 by bringing the notches 43 into register with the brackets 38 slipping the ring axially toward the board 34 and then turning the notches out of register with the brackets so that the flange 40 comes under the screws 39.

The screws 39 are then tightened to bring the outer flange 41 of the ring 42 into firm engagement with the back of board 34. The body of ring 42 may extend axially along the side walls 35 where the board 34 is relatively thin.

In Figs. 7 to 10, I have illustrated the working parts of an instrument or indicating head suitable for use in the systems above described. This instrument comprises a casing 45 having side walls 35, a front flange 36 and a bottom or back wall 46. The brackets 38 in this case are formed of a yoke which surrounds the nipple 37. The nipple 37 extends inwardly and forms a connection with the interior of a chamber, the walls of which are formed by the back plate 47, and the two spirally corrugated cylinders 50 and 51. The back plate 47 is clamped in position by the screws 48 which extend through the brackets 38 and the back 46 of the casing 45.

The helically corrugated cylinders 50 and 51 are nested or telescoped, being connected by radially extending flanges 52 and 53 respectively. The outer cylinder 50 has a similar flange 54 which is secured as by soldering to the base plate 47. The inner cylinder is shorter than the outer. The inner end of cylinder 51 is closed by a plate 56 which is secured to flange 55. A square shaft 57 is connected to the plate 56 and it extends through the hub 58 of a gear wheel 59 which is journaled in a frame plate 60. The frame plate 60 is mounted on posts or pillars 61 which rise from the base plate 47. The gear wheel 59 meshes with a pinion 62 which is pivoted in the frame plate 60 and a bracket 63. The staff 65 of the pinion 62 bears a pointer 67 which plays over the dial plate 64.

The shaft 57 has two motions namely, a rotational motion as shown by the arrow in Fig. 7 and an axial motion. In this form of the invention, the axial motion is not employed as the squared shaft 57 merely slides in the bore of the hub 58.

The cylinders 50 and 51 are helically corrugated as is indicated in Figs. 7 and 9. Consequently, the pressure of the atmosphere tends to collapse them under suction, such pressure causing a rotational motion of the free ends with respect to the attached ends. At the same time, the cylinders tend to shorten axially.

The action may better be understood by reference to Fig. 10 which illustrates diagrammatically a cylinder 68 having at one side a helical ridge 69 formed out of the wall of the cylinder and a top plate 70. Assume that this cylinder is closed off at its lower end by plate 47. If now the pressure on the inside be lowered, the outside pressure tends to move the plate 70 downwardly as shown by arrow 71 and at the same time, tends to rotate the free end of the cylinder as shown by the arrow 72. In Fig. 11, I have illustrated a modified form of indicator in which both the rotary and axial motions are employed to act upon the indicating pointer 73. This pointer 73 is mounted upon the upper end of a spiral plate 77 pivoted in a screw 75 and a bracket 76, a bracket 79 having its outer end 78 slotted to embrace the spiral or twisted plate 77 is mounted at its inner end upon plate 56 which is connected to the inner cylinder 51. In this manner, both motions of the cylinders 50—51 are employed for moving the pointer 73. It will be observed that the brackets 76 and 78 lie within the inner cylinder 51 thus effecting a material saving in space.

It will be noted that the motions of cylinders 50—51 is additive to give what would correspond to a clockwise rotary motion as illustrated in Figs. 7, 9, 10 and 11. These cylinders 50—51 need not be mathematically accurate cylinders.

If desired, the pointer may be directly attached to one of the helically corrugated cylinders as for instance to shaft 57 or to bracket 79 if no multiplying action is sought.

I do not intend to be limited to the details shown and described.

I claim:

1. In combination, a main tank, a casing arranged above the normal level of the liquid in the tank, a conduit extending from said casing to the bottom of the tank, a suction operated indicator, a tube connecting said indicator with the upper end of said casing, a suction operated delivery line also extending substantially to the bottom of the tank, a connection between said line and said casing above the normal liquid level therein, and means controlled by the level of the liquid in said casing for controlling said connection.

2. In combination, a main tank, a casing arranged above the normal level of the liquid in the tank, a conduit extending from the casing to substantially the bottom of the tank, a suction operated indicator, a tube connecting said indicator with the upper end of said casing, a suction operated delivery line also extending substantially to the bottom of the tank, a connection between said delivery line and said casing above the normal liquid level therein, means controlled by the level of the liquid in said casing for controlling said connection and a check valve in the suction line in advance of said connection.

3. In combination, a main tank, a casing arranged above the normal level of the liquid in the tank, a suction operated indicator, a tube connecting said indicator with the upper end of said casing, a suction operated delivery line extending substantially to the bottom of the tank, a connection between said delivery conduit and said casing above the normal liquid level therein, means controlled by the level of the liquid in said casing for controlling said connection, means affording open communication between the casing and the liquid in the tank at the minimum level to be gaged and independently of said delivery line, and a check valve in the delivery line in advance of said connection.

In witness whereof, I hereunto subscribe my name this 19th day of Jan., 1922.

JOHN A. DIENNER.